UNITED STATES PATENT OFFICE 2,373,299

NITROGEN DERIVATIVES OF BENZYL SULPHONIC ACIDS

Gregg Dougherty, Princeton, and Robert H. Barth, Ridgewood, N. J., assignors to Heyden Chemical Corporation, New York, N. Y., a corporation of Delaware No Drawing. Application May 28, 1943, Serial No. 488,902

5 Claims. (Cl. 260—556)

This application is for subject matter, most of which is divided from our prior application Serial No. 434,918, filed March 16, 1942.

This invention relates to new compounds which may be prepared from benzyl sulphonyl chloride or substituted benzyl sulphonyl chlorides by addition of the benzyl sulphonyl chloride to an aqueous solution of a primary or secondary hydroxy-substituted aliphatic amine or its equivalent.

These new benzyl sulphamides or sulphonamides have the following general structure:

$$X-C_6H_5-CH_2-SO_2-Y$$

in which X is selected from the group consisting of hydrogen, alkyl and halogen radicals and Y is selected from the group consisting of N-morpholinyl and hydroxyalkylamino radicals. In one of its more specific embodiments, the invention relates to compounds having the following general structure:

in which X is selected from the group consisting of hydrogen, alkyl and halogen radicals, Y is an alkenyl radical, and Z is selected from the group consisting of hydrogen, alkyl and hydroxyalkyl radicals.

These compounds are useful intermediates and plasticizers for a variety of resinous compositions.

The examples listed below are chosen to demonstrate the variety of compounds prepared and are not included for the purpose of limiting the invention. Parts are by weight.

*Example 1.*—N-benzylsulphonyl diethanolamine, having the following structure:

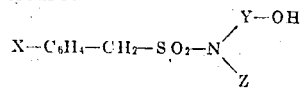

was prepared by the addition of 38.1 parts of benzyl sulphonyl chloride to 42 parts of diethanol amine in 50 parts of benzene. The mixture was heated for two hours. The hydrochloride of diethanol amine was filtered off and the benzene evaporated. The residue, after treatment with charcoal, was crystallized from methyl alcohol. The sulphamide melted at 144–145° C.

*Example 2.*—N,N'-dibenzylsulphonyl hydroxyethyl ethylene diamine, having the following structure:

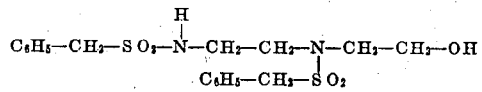

was prepared by the action of 38.1 parts of benzyl sulphonyl chloride upon 10.4 parts of hydroxy ethyl ethylene diamine in a solution which contained 10 parts of sodium hydroxide in 70 parts of water. The solid was filtered after acidification with dilute hydrochloric acid and crystallized from methyl alcohol. It melted at 152–155° C.

*Example 3.*—N-benzylsulphonyl ethanolamine, having the following structure:

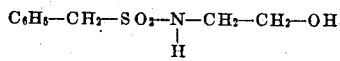

was prepared by the action of 38.1 parts of benzyl sulphonyl chloride upon a solution of 12.5 parts of monoethanol amine and 8 parts of NaOH in 100 parts of water. The sulphamide was filtered after acidification with dilute HCl. The crude product was crystallized from a 50% solution of diacetone alcohol in water. The sulphamide melted at 155–158° C.

*Example 4.*—N-benzylsulphonyl morpholine, having the following structure:

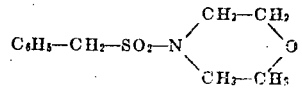

was prepared by the addition of 38.1 parts of benzyl sulphonyl chloride to 38 parts of morpholine in 100 parts of benzene. The morpholine hydrochloride was filtered off and the benzene evaporated. The residue was crystallized from methyl alcohol. The sulphamide melted at 170–172° C.

*Example 5.*—N-benzylsulphonyl cyclohexiamine, having the following structure:

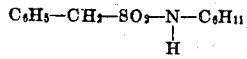

was prepared by addition of 38.1 parts of benzyl sulphonyl chloride to 40 parts of cyclohexyl amine in 100 parts of benzene. The amine hydrochloride was filtered off and the benzene evaporated. The residue was crystallized from methyl alcohol and the crystalline compound has a melting point of 128–130° C.

The amines which can' be used to make the benzyl-sulphonamide derivatives of the invention are morpholine and hydroxy-substituted primary and secondary amines (amino alcohols) having at least one replaceable hydrogen atom attached to a nitrogen atom in their molecular structures, such as ethanolamine, diethanolamine and hydroxyethyl ethylene diamine. The benzyl-sulphonyl chlorides may be ortho, meta, or para-alkylbenzyl-sulphonyl chlorides or ortho, meta, or para-chlorobenzylsulphonyl chlorides.

Having thus described our invention, what we claim as new and desire to secure by Letters Patent is:

1. An amide of benzylsulphonic acid and an amino alcohol having at least one replaceable hydrogen atom attached to a nitrogen atom in its molecular structure.

2. A benzylsulphonamide having the general structure:

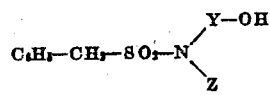

in which Y is an alkylene radical and Z is selected from the group consisting of hydrogen, alkyl and hydroxyalkyl radicals.

3. A benzylsulphonamide having the general structure:

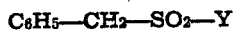

in which Y is a hydroxyalkylamino radical.

4. A compound having the structure:

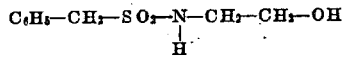

5. A compound having the structure:

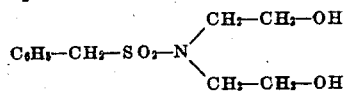

GREGG DOUGHERTY.
ROBERT H. BARTH.